US012602349B2

(12) United States Patent
Srivastava et al.

(10) Patent No.: US 12,602,349 B2
(45) Date of Patent: Apr. 14, 2026

(54) HANDLING DYNAMIC TENSOR LENGTHS IN A RECONFIGURABLE PROCESSOR THAT INCLUDES MULTIPLE MEMORY UNITS

(71) Applicant: SambaNova Systems, Inc., Palo Alto, CA (US)

(72) Inventors: Abhishek Srivastava, Sunnyvale, CA (US); Matthew Vilim, Redwood City, CA (US); Raghu Prabhakar, San Jose, CA (US); Sankar Rachuru, Palo Alto, CA (US); Zhekun Zhang, Palo Alto, CA (US); Matheen Musaddiq, Austin, TX (US); Apurv Vivek, Palo Alto, CA (US); Sitanshu Gupta, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/213,598

(22) Filed: Jun. 23, 2023

(65) Prior Publication Data

US 2024/0427727 A1     Dec. 26, 2024

(51) Int. Cl.
　　*G06F 15/78*　　　(2006.01)
　　*G06F 15/82*　　　(2006.01)
(52) U.S. Cl.
　　CPC ........ *G06F 15/7867* (2013.01); *G06F 15/825* (2013.01)
(58) Field of Classification Search
　　CPC .... G06F 15/7867; G06F 15/82; G06F 15/825; G06F 9/38875; G06F 8/41
　　See application file for complete search history.

(56) References Cited

U.S. PATENT DOCUMENTS

| | | | |
|---|---|---|---|
| 10,698,853 | B1 | 6/2020 | Grohoski et al. |
| 10,768,899 | B2 | 9/2020 | Koeplinger et al. |
| 10,831,507 | B2 | 11/2020 | Shah et al. |

(Continued)

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Keith E Vicary
(74) *Attorney, Agent, or Firm* — FP; Sikander M. Khan

(57)　　　ABSTRACT

In some aspects, a program is executed on a coarse-grained reconfigurable (CGR) processor. The CGR determines that the program produces an output that includes a variable length tensor, determines a maximum size of the variable length tensor and sets, based on the maximum size, a maximum of a counter associated with the program. The counter is set to an initial value of zero. The CGR initiates execution of the program, causing the program to receive an input tensor. Based on determining that the program is operating on a first portion of the input tensor, the CGR performs an update to the counter, to create an updated counter, and communicates the updated counter to one or more consumers within the program. After determining that the program has completed operating on the input tensor, a final size of the output is communicated to one or more downstream consumers external to the program.

20 Claims, 12 Drawing Sheets

(56) References Cited

U.S. PATENT DOCUMENTS

| | | | |
|---|---|---|---|
| 11,055,141 B2 | 7/2021 | Prabhakar et al. | |
| 11,080,227 B2 | 8/2021 | Koeplinger et al. | |
| 11,126,574 B1 | 9/2021 | Prabhakar et al. | |
| 11,150,872 B2 | 10/2021 | Wang et al. | |
| 11,182,221 B1 | 11/2021 | Sivaramakrishnan et al. | |
| 11,182,264 B1 | 11/2021 | Sivaramakrishnan et al. | |
| 11,188,497 B2 | 11/2021 | Shah et al. | |
| 11,191,182 B1 | 11/2021 | Wilson et al. | |
| 11,195,080 B1 | 12/2021 | Nama et al. | |
| 11,200,096 B1 | 12/2021 | Shenbagam et al. | |
| 11,204,889 B1 | 12/2021 | Prabhakar et al. | |
| 11,227,207 B1 | 1/2022 | Nama et al. | |
| 11,232,360 B1 | 1/2022 | Nama et al. | |
| 11,237,880 B1 | 2/2022 | Raumann et al. | |
| 11,237,971 B1 | 2/2022 | Brown et al. | |
| 11,239,846 B1 | 2/2022 | ur Rahman et al. | |
| 11,250,061 B1 | 2/2022 | Nama et al. | |
| 11,250,105 B2 | 2/2022 | Wang et al. | |
| 11,256,987 B1 | 2/2022 | Terakanambi Sheshadri et al. | |
| 11,263,170 B1 | 3/2022 | Nama et al. | |
| 11,290,113 B1 | 3/2022 | ur Rahman et al. | |
| 11,290,114 B1 | 3/2022 | ur Rahman et al. | |
| 11,323,124 B1 | 5/2022 | ur Rahman et al. | |
| 11,327,713 B2 | 5/2022 | Wang et al. | |
| 11,327,717 B2 | 5/2022 | Wang et al. | |
| 11,327,771 B1 | 5/2022 | Grohoski et al. | |
| 11,327,923 B2 | 5/2022 | Wang et al. | |
| 11,328,038 B2 | 5/2022 | Wang et al. | |
| 11,328,209 B1 | 5/2022 | Terakanambi Sheshadri et al. | |
| 11,334,109 B1 | 5/2022 | ur Rahman et al. | |
| 11,366,783 B1 | 6/2022 | Prabhakar et al. | |
| 11,386,038 B2 | 7/2022 | Prabhakar et al. | |
| 11,392,740 B2 | 7/2022 | Raumann et al. | |
| 11,409,540 B1 | 8/2022 | Grohoski et al. | |
| 11,410,027 B2 | 8/2022 | Chen et al. | |
| 11,429,349 B1 | 8/2022 | Oklobdzija et al. | |
| 11,556,494 B1 | 1/2023 | Grohoski et al. | |
| 11,561,803 B1 | 1/2023 | Zou et al. | |
| 11,645,057 B2 | 5/2023 | Koeplinger et al. | |
| 11,662,986 B1 * | 5/2023 | Catron | G06F 8/41 |
| | | | 718/104 |
| 11,709,664 B2 | 7/2023 | Chen et al. | |
| 11,714,780 B2 | 8/2023 | Koeplinger et al. | |
| 11,782,729 B2 | 10/2023 | Grohoski et al. | |
| 11,782,760 B2 | 10/2023 | Misra et al. | |
| 11,809,908 B2 | 11/2023 | Kumar et al. | |
| 11,836,629 B2 | 12/2023 | Liu | |
| 11,928,512 B2 | 3/2024 | Prabhakar et al. | |
| 11,934,343 B2 | 3/2024 | Nama et al. | |
| 11,995,529 B2 | 5/2024 | Nama et al. | |
| 12,079,156 B2 | 9/2024 | Nama et al. | |
| 2018/0204117 A1 * | 7/2018 | Brevdo | G06N 20/00 |
| 2020/0133743 A1 * | 4/2020 | Baghsorkhi | G06N 3/10 |
| 2021/0055940 A1 | 2/2021 | Shah et al. | |
| 2021/0081691 A1 | 3/2021 | Chen et al. | |
| 2022/0092247 A1 * | 3/2022 | Koeplinger | G06F 8/443 |
| 2022/0147328 A1 * | 5/2022 | Brown | G06F 8/457 |
| 2022/0229641 A1 * | 7/2022 | Meister | G06N 3/08 |
| 2022/0309317 A1 | 9/2022 | Nama et al. | |
| 2022/0309318 A1 | 9/2022 | Nama et al. | |

OTHER PUBLICATIONS

Prabhakar et al., Plasticine: A Reconfigurable Architecture for Parallel Patterns, ISCA, Jun. 24-28, 2017, 14 pages.

* cited by examiner

100

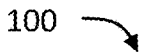

```
┌─────────────────────────────────────────┐
│                                           │
│          ┌─────────────────────┐          │
│          │      Compiler        │          │
│          │        160           │          │
│          └─────────────────────┘          │
│                     │                      │
│                     ▼                      │
│          ╱─────────────────────╱          │
│         ╱    Configuration     ╱           │
│        ╱      file 165        ╱            │
│       ╱─────────────────────╱             │
│                     │                      │
│                     ▼                      │
│          ┌─────────────────────┐          │
│          │  Runtime processes   │          │
│          │        170           │          │
│          └─────────────────────┘          │
│                                           │
└─────────────────────────────────────────┘
```

```
┌──────────────────────────────────────────────────────────┐
│   Coarse-grained reconfigurable (CGR) processor 110        │
│                                                            │
│                              130                           │
│   ┌──────────┐      ┌──────────┐ ┌─────────────────────┐  │
│   │  I/O I/F │◄────►│          │ │     CGR array        │  │
│   │   138    │◄─────│  Top-    │ │ (array of CGR units) │  │
│   └──────────┘      │  level   │ │        with          │  │
│                     │ network  │►│  array-level network │  │
│   ┌──────────┐      │   TLN    │ │        (ALN)         │  │
│   │Memory I/F│◄─────│          │◄│        120           │  │
│   │   139    │      │          │ │                      │  │
│   └──────────┘      └──────────┘ └─────────────────────┘  │
└──────────────────────────────────────────────────────────┘

┌──────────┐
│  Host    │◄────►
│  180     │
└──────────┘
    185

┌──────────┐
│ Memory   │◄────►
│  190     │
└──────────┘
    195
```

Storage 230

CRM
235

Input
210

Input
data

Memory 226

Output
data

Output
240

ALU
224

Control logic 222

Processor 220

300

400

500

600

700

710

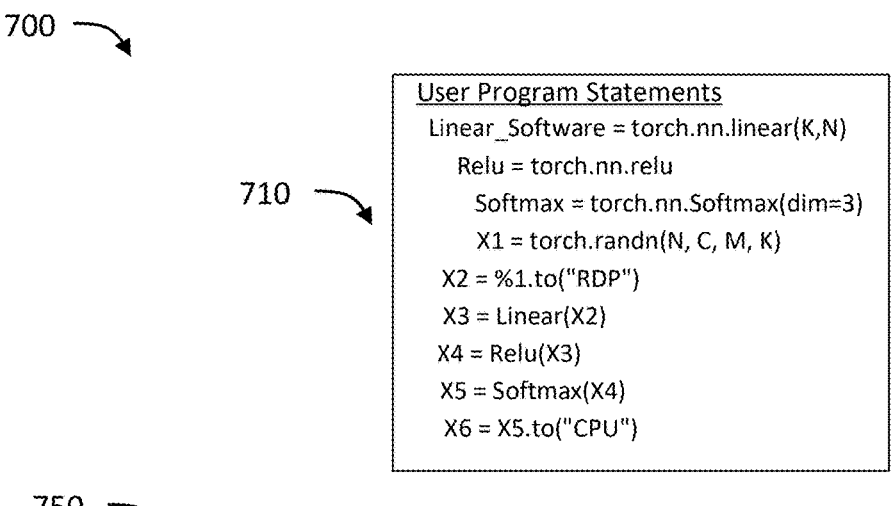

User Program Statements
Linear_Software = torch.nn.linear(K,N)
Relu = torch.nn.relu
Softmax = torch.nn.Softmax(dim=3)
X1 = torch.randn(N, C, M, K)
X2 = %1.to("RDP")
X3 = Linear(X2)
X4 = Relu(X3)
X5 = Softmax(X4)
X6 = X5.to("CPU")

750

User Program Computation Graph

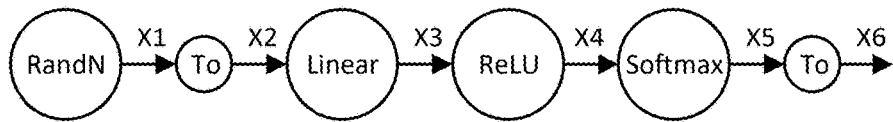

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | ⎫ |
| %5 = air.Sum(%4, dim: 3): | NxCxMx1 bf16 | ⎬ Softmax |
| %6 = air.Div(%4, %5): | NxCxMxN bf16 | ⎭ lowering |
| %7 = air.Output(%6) | | |

850

Air/Tensor Computation Graph

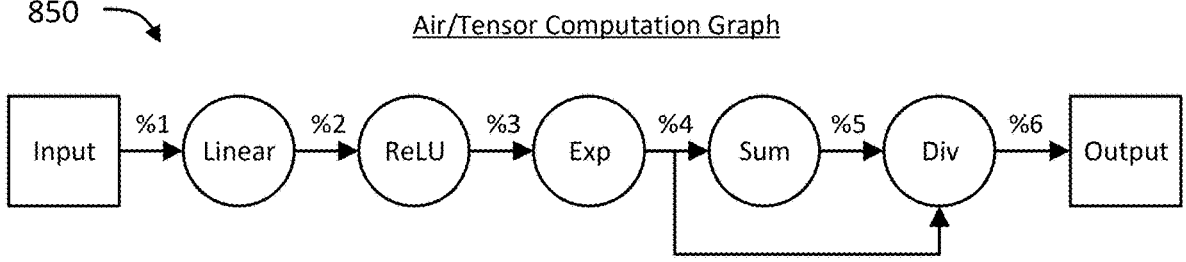

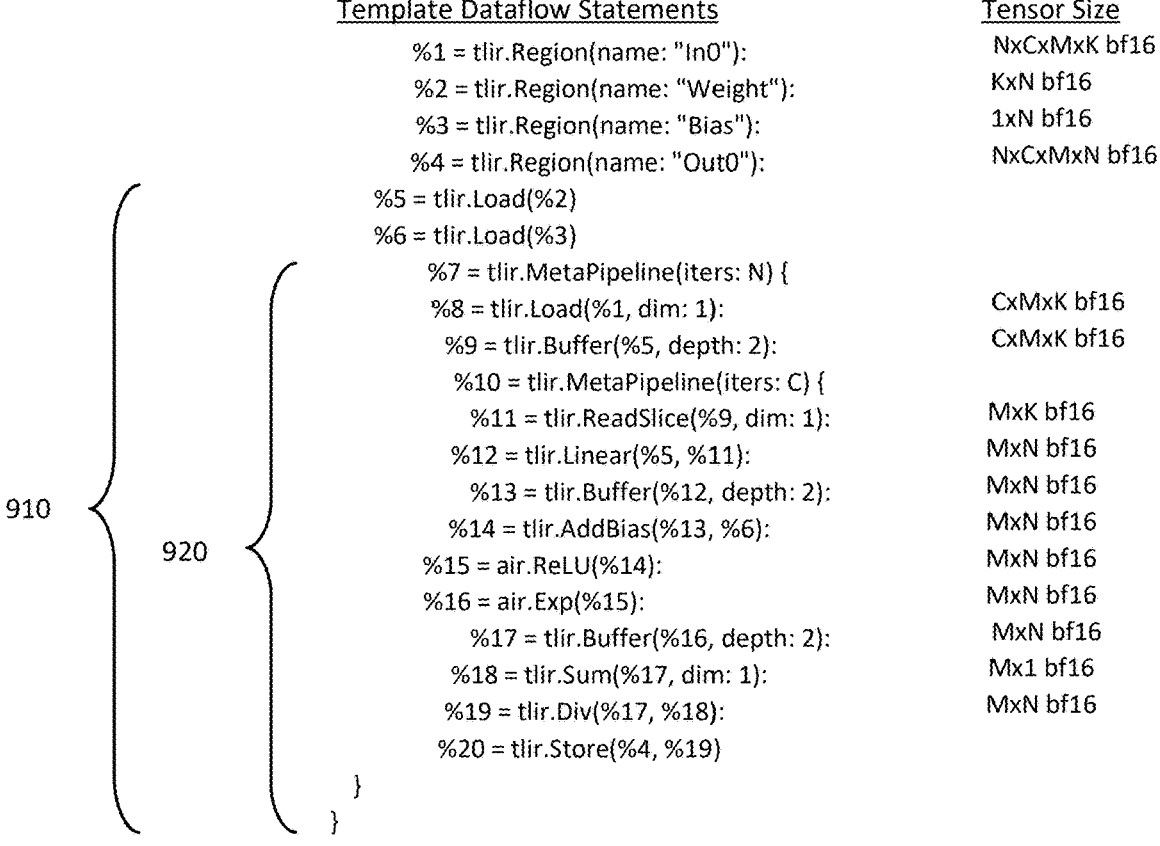

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3) | |
| %7 = tlir.MetaPipeline(iters: N) { | |
| %8 = tlir.Load(%1, dim: 1): | CxMxK bf16 |
| %9 = tlir.Buffer(%5, depth: 2): | CxMxK bf16 |
| %10 = tlir.MetaPipeline(iters: C) { | |
| %11 = tlir.ReadSlice(%9, dim: 1): | MxK bf16 |
| %12 = tlir.Linear(%5, %11): | MxN bf16 |
| %13 = tlir.Buffer(%12, depth: 2): | MxN bf16 |
| %14 = tlir.AddBias(%13, %6): | MxN bf16 |
| %15 = air.ReLU(%14): | MxN bf16 |
| %16 = air.Exp(%15): | MxN bf16 |
| %17 = tlir.Buffer(%16, depth: 2): | MxN bf16 |
| %18 = tlir.Sum(%17, dim: 1): | Mx1 bf16 |
| %19 = tlir.Div(%17, %18): | MxN bf16 |
| %20 = tlir.Store(%4, %19) | |
| } | |
| } | |

910 920

950      Unstitched Template Computation Graph

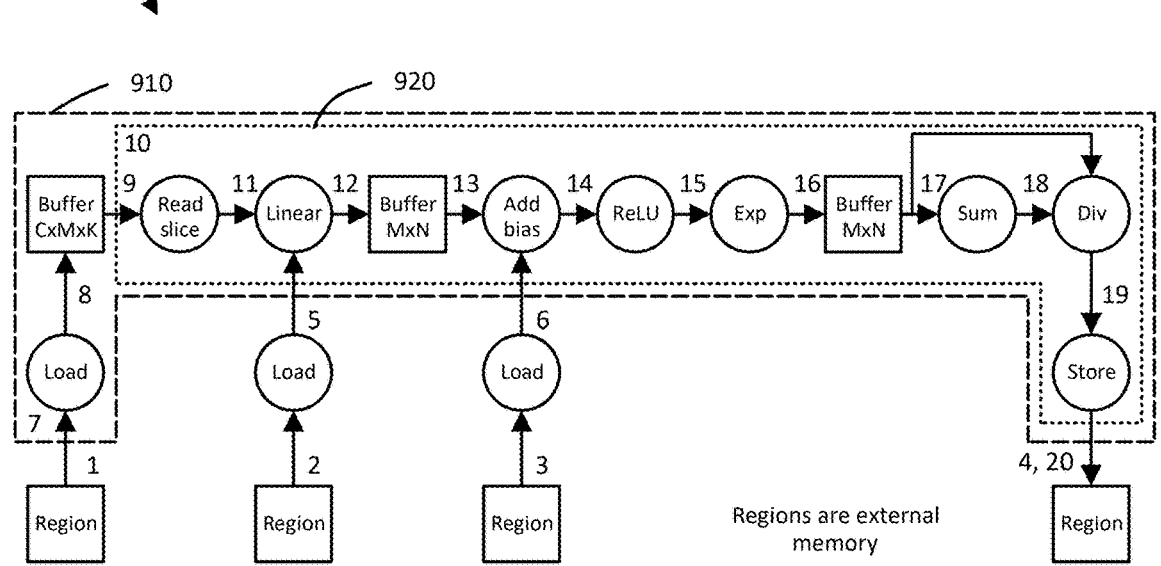

Regions are external memory

FIG. 9

1100
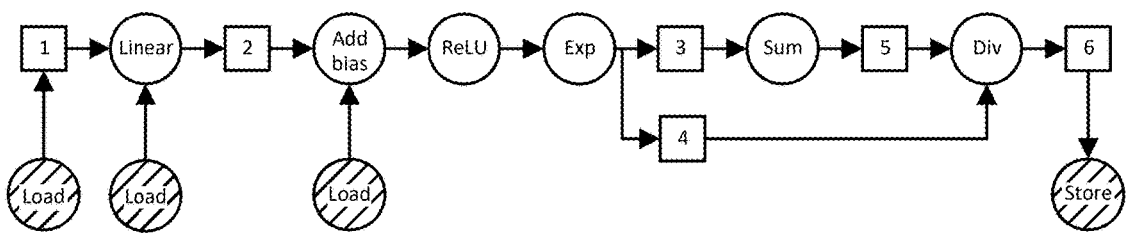
Logical Computation Graph
1150
Physical Layout
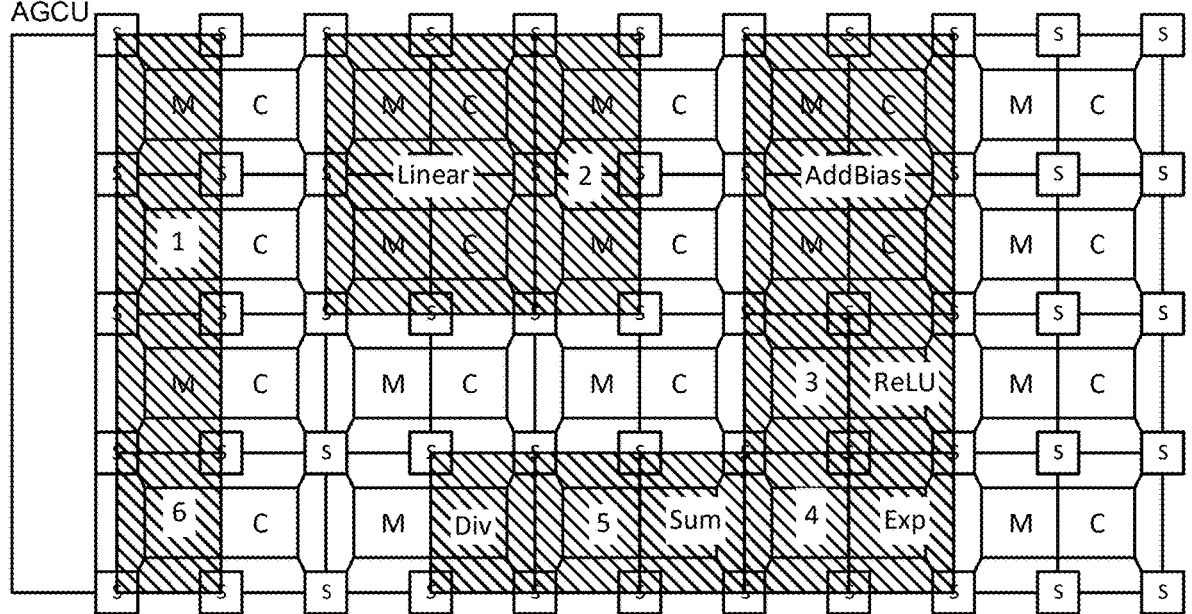
FIG. 11

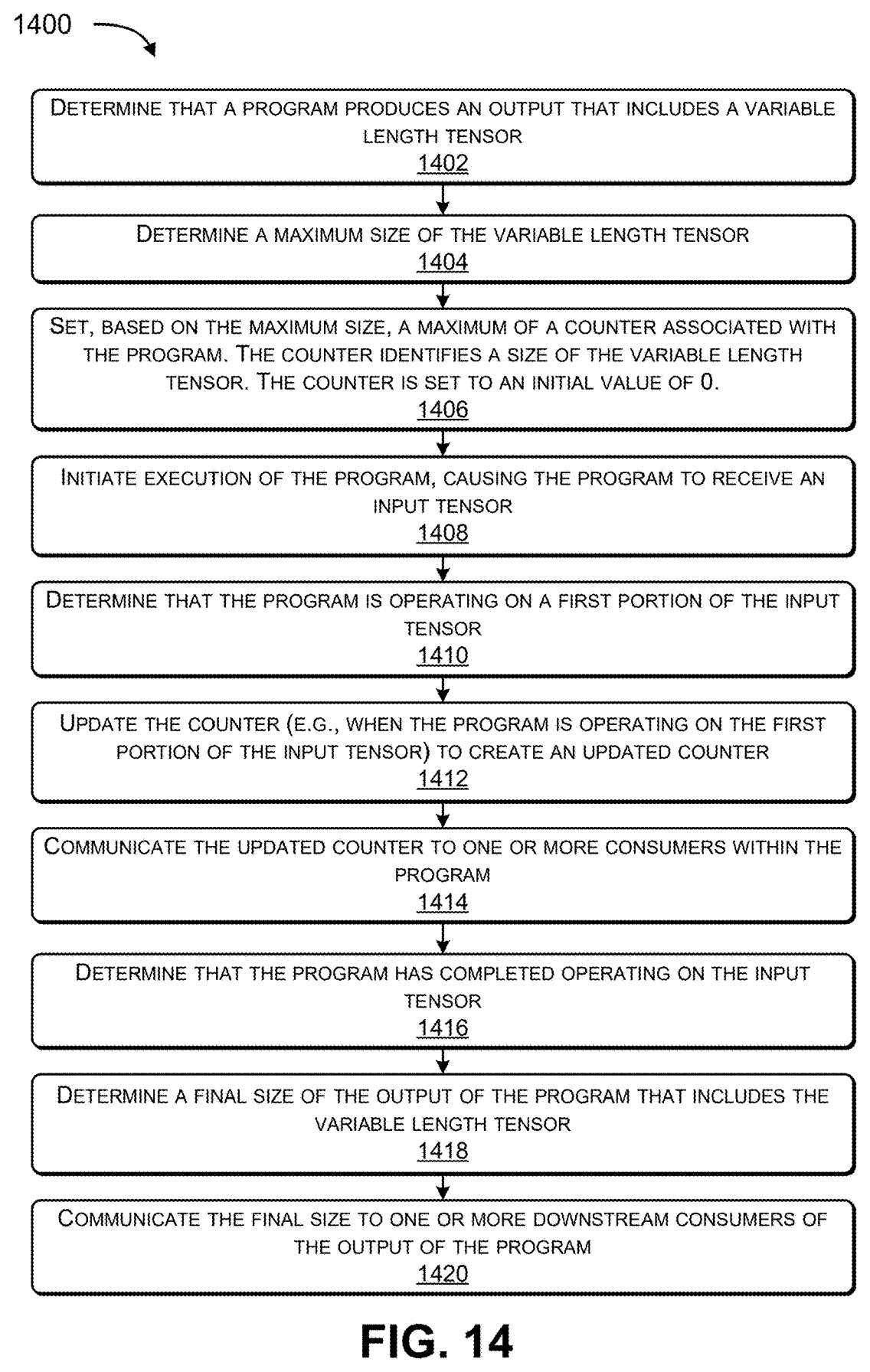

1400

DETERMINE THAT A PROGRAM PRODUCES AN OUTPUT THAT INCLUDES A VARIABLE
LENGTH TENSOR
1402

DETERMINE A MAXIMUM SIZE OF THE VARIABLE LENGTH TENSOR
1404

SET, BASED ON THE MAXIMUM SIZE, A MAXIMUM OF A COUNTER ASSOCIATED WITH
THE PROGRAM. THE COUNTER IDENTIFIES A SIZE OF THE VARIABLE LENGTH
TENSOR. THE COUNTER IS SET TO AN INITIAL VALUE OF 0.
1406

INITIATE EXECUTION OF THE PROGRAM, CAUSING THE PROGRAM TO RECEIVE AN
INPUT TENSOR
1408

DETERMINE THAT THE PROGRAM IS OPERATING ON A FIRST PORTION OF THE INPUT
TENSOR
1410

UPDATE THE COUNTER (E.G., WHEN THE PROGRAM IS OPERATING ON THE FIRST
PORTION OF THE INPUT TENSOR) TO CREATE AN UPDATED COUNTER
1412

COMMUNICATE THE UPDATED COUNTER TO ONE OR MORE CONSUMERS WITHIN THE
PROGRAM
1414

DETERMINE THAT THE PROGRAM HAS COMPLETED OPERATING ON THE INPUT
TENSOR
1416

DETERMINE A FINAL SIZE OF THE OUTPUT OF THE PROGRAM THAT INCLUDES THE
VARIABLE LENGTH TENSOR
1418

COMMUNICATE THE FINAL SIZE TO ONE OR MORE DOWNSTREAM CONSUMERS OF
THE OUTPUT OF THE PROGRAM
1420

FIG. 14

HANDLING DYNAMIC TENSOR LENGTHS IN A RECONFIGURABLE PROCESSOR THAT INCLUDES MULTIPLE MEMORY UNITS

This application claims the benefit of U.S. Provisional Patent Application No. 63/309,908, entitled, "Dynamically-Sized Data Structures on Data Flow Architectures" filed on 14 Feb. 2022. The provisional application is hereby incorporated by reference for all purposes.

CROSS-REFERENCES AND INCORPORATIONS

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Implementation (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled "VIRTUALIZATION OF A RECONFIGURABLE DATA PROCESSOR";

U.S. Nonprovisional patent application Ser. No. 16/862, 445, now U.S. Pat. No. 11,188,497 B2, filed Apr. 29, 2020, entitled "VIRTUALIZATION OF A RECONFIGURABLE DATA PROCESSOR";

U.S. Nonprovisional patent application Ser. No. 16/197, 826, now U.S. Pat. No. 10,831,507 B2, filed Nov. 21, 2018, entitled "CONFIGURATION LOAD OF A RECONFIGURABLE DATA PROCESSOR";

U.S. Nonprovisional patent application Ser. No. 16/198, 086, now U.S. Pat. No. 11,188,497 B2, filed Nov. 21, 2018, entitled "CONFIGURATION UNLOAD OF A RECONFIGURABLE DATA PROCESSOR";

U.S. Nonprovisional patent application Ser. No. 17/093, 543, filed Nov. 9, 2020, entitled "EFFICIENT CONFIGURATION OF A RECONFIGURABLE DATA PROCESSOR";

U.S. Nonprovisional patent application Ser. No. 16/260, 548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME";

U.S. Nonprovisional patent application Ser. No. 16/536, 192, now U.S. Pat. No. 11,080,227 B2, filed Aug. 8, 2019, entitled "COMPILER FLOW LOGIC FOR RECONFIGURABLE ARCHITECTURES";

U.S. Nonprovisional patent application Ser. No. 17/326, 128, filed May 20, 2021, entitled "COMPILER FLOW LOGIC FOR RECONFIGURABLE ARCHITECTURES";

U.S. Nonprovisional patent application Ser. No. 16/407, 675, now U.S. Pat. No. 11,386,038 B2, filed May 9, 2019, entitled "CONTROL FLOW BARRIER AND RECONFIGURABLE DATA PROCESSOR";

U.S. Nonprovisional patent application Ser. No. 16/504, 627, now U.S. Pat. No. 11,055,141 B2, filed Jul. 8, 2019, entitled "QUIESCE RECONFIGURABLE DATA PROCESSOR";

U.S. Nonprovisional patent application Ser. No. 17/322, 697, filed May 17, 2021, entitled "QUIESCE RECONFIGURABLE DATA PROCESSOR";

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION";

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION";

U.S. Nonprovisional patent application Ser. No. 16/590, 058, now U.S. Pat. No. 11,327,713 B2, filed Oct. 1, 2019, entitled "COMPUTATION UNITS FOR FUNCTIONS BASED ON LOOKUP TABLES";

U.S. Nonprovisional patent application Ser. No. 16/695, 138, now U.S. Pat. No. 11,328,038 B2, filed Nov. 25, 2019, entitled "COMPUTATIONAL UNITS FOR BATCH NORMALIZATION";

U.S. Nonprovisional patent application Ser. No. 16/688, 069, filed Nov. 19, 2019, now U.S. Pat. No. 11,327,717 B2, entitled "LOOK-UP TABLE WITH INPUT OFFSETTING";

U.S. Nonprovisional patent application Ser. No. 16/718, 094, filed Dec. 17, 2019, now U.S. Pat. No. 11,150,872 B2, entitled "COMPUTATIONAL UNITS FOR ELEMENT APPROXIMATION";

U.S. Nonprovisional patent application Ser. No. 16/560, 057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME";

U.S. Nonprovisional patent application Ser. No. 16/572, 527, now U.S. Pat. No. 11,410,027 B2, filed Sep. 16, 2019, entitled "Performance Estimation-Based Resource Allocation for Reconfigurable Architectures";

U.S. Nonprovisional patent application Ser. No. 15/930, 381, now U.S. Pat. No. 11,250,105 B2, filed May 12, 2020, entitled "COMPUTATIONALLY EFFICIENT GENERAL MATRIX-MATRIX MULTIPLICATION (GEMM)";

U.S. Nonprovisional patent application Ser. No. 17/337, 080, now U.S. Pat. No. 11,328,209 B1, filed Jun. 2, 2021, entitled "MEMORY EFFICIENT DROPOUT";

U.S. Nonprovisional patent application Ser. No. 17/337, 126, now U.S. Pat. No. 11,256,987 B1, filed Jun. 2, 2021, entitled "MEMORY EFFICIENT DROPOUT, WITH REORDERING OF DROPOUT MASK ELEMENTS";

U.S. Nonprovisional patent application Ser. No. 16/890, 841, filed Jun. 2, 2020, entitled "ANTICONGESTION FLOW CONTROL FOR RECONFIGURABLE PROCESSORS";

U.S. Nonprovisional patent application Ser. No. 17/023, 015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS";

U.S. Nonprovisional patent application Ser. No. 17/031, 679, filed Sep. 24, 2020, entitled "SYSTEMS AND METHODS FOR MEMORY LAYOUT DETERMINATION AND CONFLICT RESOLUTION";

U.S. Nonprovisional patent application Ser. No. 17/175, 289, now U.S. Pat. No. 11,126,574 B1, filed Feb. 12, 2021, entitled "INSTRUMENTATION PROFILING FOR RECONFIGURABLE PROCESSORS";

U.S. Nonprovisional patent application Ser. No. 17/371, 049, filed Jul. 8, 2021, entitled "SYSTEMS AND METHODS FOR EDITING TOPOLOGY OF A RECONFIGURABLE DATA PROCESSOR";

U.S. Nonprovisional patent application Ser. No. 16/922, 975, filed Jul. 7, 2020, entitled "RUNTIME VIRTU-ALIZATION OF RECONFIGURABLE DATA FLOW RESOURCES";

U.S. Nonprovisional patent application Ser. No. 16/996, 666, filed Aug. 18, 2020, entitled "RUNTIME PATCH-ING OF CONFIGURATION FILES";

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS";

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCES-SOR-AS-A-SERVICE (RPAAS)";

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCES-SOR-AS-A-SERVICE (RPAAS)";

U.S. Nonprovisional patent application Ser. No. 17/185, 264, filed Feb. 25, 2021, entitled "TIME-MULTI-PLEXED USE OF RECONFIGURABLE HARD-WARE";

U.S. Nonprovisional patent application Ser. No. 17/216, 647, now U.S. Pat. No. 11,204,889 B1, filed Mar. 29, 2021, entitled "TENSOR PARTITIONING AND PAR-TITION ACCESS ORDER";

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING";

U.S. Nonprovisional patent application Ser. No. 17/216, 657, now U.S. Pat. No. 11,263,170 B1, filed Mar. 29, 2021, entitled "LOSSLESS TILING IN CONVOLU-TION NETWORKS—PADDING BEFORE TILING, LOCATION-BASED TILING, AND ZEROING-OUT";

U.S. Nonprovisional patent application Ser. No. 17/384, 515, filed Jul. 23, 2021, entitled "LOSSLESS TILING IN CONVOLUTION NETWORKS—MATERIAL-IZATION OF TENSORS";

U.S. Nonprovisional patent application Ser. No. 17/216, 651, now U.S. Pat. No. 11,195,080 B1, filed Mar. 29, 2021, entitled "LOSSLESS TILING IN CONVOLU-TION NETWORKS—TILING CONFIGURATION";

U.S. Nonprovisional patent application Ser. No. 17/216, 652, now U.S. Pat. No. 11,227,207 B1, filed Mar. 29, 2021, entitled "LOSSLESS TILING IN CONVOLU-TION NETWORKS—SECTION BOUNDARIES";

U.S. Nonprovisional patent application Ser. No. 17/216, 654, now U.S. Pat. No. 11,250,061 B1, filed Mar. 29, 2021, entitled "LOSSLESS TILING IN CONVOLU-TION NETWORKS—READ-MODIFY-WRITE IN BACKWARD PASS";

U.S. Nonprovisional patent application Ser. No. 17/216, 655, now U.S. Pat. No. 11,232,360 B1, filed Mar. 29, 2021, entitled "LOSSLESS TILING IN CONVOLU-TION NETWORKS—WEIGHT GRADIENT CAL-CULATION";

U.S. Nonprovisional patent application Ser. No. 17/364, 110, filed Jun. 30, 2021, entitled "LOSSLESS TILING IN CONVOLUTION NETWORKS—TILING CON-FIGURATION FOR A SEQUENCE OF SECTIONS OF A GRAPH";

U.S. Nonprovisional patent application Ser. No. 17/364, 129, filed Jun. 30, 2021, entitled "LOSSLESS TILING IN CONVOLUTION NETWORKS—TILING CON-FIGURATION BETWEEN TWO SECTIONS";

U.S. Nonprovisional patent application Ser. No. 17/364, 141, filed Jun. 30, 2021, entitled "LOSSLESS TILING IN CONVOLUTION NETWORKS—PADDING AND RE-TILING AT SECTION BOUNDARIES";

U.S. Nonprovisional patent application Ser. No. 17/384, 507, filed Jul. 23, 2021, entitled "LOSSLESS TILING IN CONVOLUTION NETWORKS—BACKWARD PASS";

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP";

U.S. Provisional Patent Application No. 63/165,073, filed Mar. 23, 2021, entitled "FLOATING POINT MULTI-PLY-ADD, ACCUMULATE UNIT WITH CARRY-SAVE ACCUMULATOR IN BF16 AND FLP32 FOR-MAT";

U.S. Provisional Patent Application No. 63/166,221, filed Mar. 25, 2021, entitled "LEADING ZERO AND LEADING ONE DETECTOR PREDICTOR SUIT-ABLE FOR CARRY-SAVE FORMAT";

U.S. Provisional Patent Application No. 63/190,749, filed May 19, 2021, entitled "FLOATING POINT MULTI-PLY-ADD, ACCUMULATE UNIT WITH CARRY-SAVE ACCUMULATOR";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING";

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCU-MULATOR";

U.S. Nonprovisional patent application Ser. No. 17/216, 509, now U.S. Pat. No. 11,191,182 B1, filed Mar. 29, 2021, entitled "UNIVERSAL RAIL KIT";

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS";

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS";

U.S. Nonprovisional patent application Ser. No. 17/378, 342, now U.S. Pat. No. 11,556,494 B1, filed Jul. 16, 2021, entitled "DEFECT REPAIR FOR A RECONFIG-URABLE DATA PROCESSOR";

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR";

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PRO-CESSOR";

U.S. Provisional Patent Application No. 63/220,266, filed Jul. 9, 2021, entitled "LOGIC BIST AND FUNC-TIONAL TEST FOR A CGRA";

U.S. Provisional Patent Application No. 63/195,664, filed Jun. 1, 2021, entitled "VARIATION-TOLERANT VARIABLE-LENGTH CLOCK-STRETCHER MOD-ULE WITH IN-SITU END-OF-CHAIN DETECTION MECHANISM";

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH";

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET";

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES";

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION";

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC";

U.S. Provisional Patent Application No. 63/230,782, filed Aug. 8, 2021, entitled "LOW LATENCY MASTER-SLAVE CLOCKED STORAGE ELEMENT";

U.S. Provisional Patent Application No. 63/236,218, filed Aug. 23, 2021, entitled "SWITCH FOR A RECON-FIGURABLE DATAFLOW PROCESSOR";

U.S. Provisional Patent Application No. 63/236,214, filed Aug. 23, 2021, entitled "SPARSE MATRIX MULTI-PLIER";

U.S. Provisional Patent Application No. 63/389,767, filed Jul. 15, 2022. entitled "PEER-TO-PEER COMMUNI-CATION BETWEEN RECONFIGURABLE DATA-FLOW UNITS";

U.S. Provisional Patent Application No. 63/405,240, filed Sep. 9, 2022, entitled "PEER-TO-PEER ROUTE THROUGH IN A RECONFIGURABLE COMPUT-ING SYSTEM".

All of the related application(s) and documents listed above are hereby incorporated by reference herein for all purposes.

BACKGROUND

Technical Field

The technology disclosed relates to handling programs that use dynamic tensor lengths when executed on dataflow architectures.

Context

The subject matter discussed in this section should not be assumed to be prior art merely as a result of its mention in this section. Similarly, a problem mentioned in this section or associated with the subject matter provided as back-ground should not be assumed to have been previously recognized in the prior art. The subject matter in this section merely represents different approaches, which in and of themselves can also correspond to implementations of the claimed technology.

Unlike a central processing unit (CPU), a dataflow archi-tecture maps applications spatially across distributed com-pute and memory units. Because such an architecture does not include a central control logic, a distributed control system passes tokens between operators in a pipeline to communicate the availability of space and to synchronize the flow of control. An operator may program units stati-cally, expecting to determine input/output tensor sizes at compile-time. However, such an architecture makes han-dling data-dependent output tensors difficult.

SUMMARY

In some aspects, the techniques described herein relate to executing a program on a coarse-grained reconfigurable (CGR) processor including an array of CGR units. Execut-ing the program may include determining that the program produces an output that includes a variable length tensor; determining a maximum size of the variable length tensor; setting, based on the maximum size, a maximum of a counter associated with the program, the counter set to an initial value of zero; initiating execution of the program, wherein execution of the program causes the program to receive an input tensor; determining that the program is operating on a first portion of the input tensor; performing an update to the counter, while the program is executing and based on the program operating on the first portion of the input tensor, to create an updated counter; and communi-cating the updated counter to one or more downstream consumers of the output of the program.

Intermediate counter values are communicated within the operator, e.g., "intra-operator", while a final length of the output tensor is communicated to downstream consumers, e.g., "inter-operator". Intermediate values are not commu-nicated outside the operator.

Executing the program may include determining, at a compile time, that the program produces the output that includes a variable length tensor is performed. Executing the program may include determining, at a compile time, the maximum size of the variable length tensor is performed. Executing the program may include determining that the program is operating on a second portion of the input tensor; performing a second update to the counter (based on the program operating on the second portion of the input tensor) to create a second updated counter; and communicating the second updated counter intra-operator. Executing the pro-gram may include determining that the program has com-pleted operating on the input tensor; determining a final size of the output of the program that includes the variable length tensor; and communicating the final size to the one or more downstream consumers of the output of the program. In some cases, the counter may be located in: a read context of a memory unit that is used when reading the first portion of the input tensor; a write context of the memory unit that is used when writing a portion of the output; or any combi-nation thereof. In some cases, the write context performs a write operation to a first buffer in a scratchpad of the memory unit, the read context performs a read operation from a second buffer in the scratchpad of the memory unit, and the read operation and the write operation overlap in time.

Particular aspects of the technology disclosed are described in the claims, specification and drawings.

BRIEF DESCRIPTION OF THE DRAWINGS

The technology will be described with reference to the drawings, in which:

FIG. 1 illustrates an example system including a coarse-grained reconfigurable (CGR) processor, a host, and a memory.

FIG. 7 shows an example user program in an example first stage of the compiler stack.

FIG. 8 shows the user program in an example second stage of the compiler stack.

FIG. 9 shows the user program in an example third stage of the compiler stack.

FIG. 11 shows the logical computation graph and an example physical layout of the user program.

FIG. 14 illustrates a flowchart of a process that includes updating a counter to create an updated counter.

Figure 2:
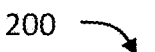
FIG. 2 illustrates an example of a computer, including an input device, a processor, a storage device, and an output device.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

Unlike architectures that use a central processing unit (CPU), a dataflow architecture, as described herein, maps an application spatially across distributed compute units and memory units. Because the dataflow architecture does not include central control logic, a distributed control system passes tokens between operators in the pipeline to communicate the availability of space and to synchronize the control flow. Each operator programs units statically, expecting the knowledge of input/output tensor sizes at compile time.

The systems and techniques described herein enable a dataflow architecture to handle data-dependent output tensor sizes. A tensor is an N dimensional array of elements (N>0). For easy of understanding, most of the examples herein use N=1. However, it should be understood that the systems and techniques can be used to handle tensors where N>1.

A dataflow architecture uses a distributed architecture (rather than a centralized architecture) in which control is distributed and memory is distributed memory (e.g., with each memory unit having its own address space). The systems and techniques described herein use three techniques to handle data-dependent dynamic tensor lengths in a dataflow architecture. (1) Intra-operator handling of dynamic tensor sizes. A software program maintains a counter in one of the contexts (e.g., write context or read context) that is incremented conditionally on a predicate. The value of the counter is communicated to consumers of the output. (2) Intra-operator control synchronization. The control flow synchronizes a tensor size counter between a producer of the size counter and consumers of the size counter to avoid the consumers using stale counter values. (3) Inter-operator communication of dynamic tensor length. Downstream operators that intend to use an operator's output tensor receive a final tensor size, which is communicated on-chip using scalars or through off-chip memory. Because an operator and its associated downstream consumers use a tensor size to compile, an upper bound for the tensor size may be used. This size may then be replaced by a scalar value that is generated at runtime.

As an example, a program may be executed on a coarse-grained reconfigurable (CGR) processor comprising an array of CGR to perform various operations. The operations may include determining that the program produces an output that includes a variable length tensor, determining a maximum size of the variable length tensor, and setting, based on the maximum size, a maximum of a counter associated with the program. The counter is set to an initial value that is less than the maximum. The operations may include initiating execution of the program. Execution of the program causes the program to receive an input tensor. The operations may include determining that the program is operating on a first portion of the input tensor, performing an update to the counter (while the program is executing) to create an updated counter, and communicating the updated counter to one or more downstream consumers of the output of the program. Determining that the program produces the output that includes a variable length tensor is performed at a compile time. Determining that the maximum size of the variable length tensor is performed at a compile time. The operations may include determining that the program is operating on a second portion of the input tensor, performing a second update to the counter (while the program is executing) to create a second updated counter, and communicating the second updated counter to the one or more downstream consumers of the output of the program. The operations include determining that the program has completed operating on the input tensor, determining a final size of the output of the program that includes the variable length tensor, and communicating the final size to the one or more downstream consumers of the output of the program. In some cases, the counter may be located in: a read context of a memory unit that is used when reading the first portion of the input tensor, a write context of the memory unit that is used when writing a portion of the output, or any combination thereof. In some cases, the write context performs a write operation to a first buffer in a scratchpad of the memory unit, the read context performs a read operation from a second buffer in the scratchpad of the memory unit, and the read operation and the write operation overlap in time.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms comprising and consisting have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetical, or mechanical, between the things that are connected, without any intervening things or devices.

The term configured (to perform a task or tasks) is a broad recitation of structure generally meaning "having circuitry that" performs the task or tasks during operation. As such, the described item can be configured to perform the task even when the unit/circuit/component is not currently on or active. In general, the circuitry that forms the structure corresponding to "configured to" may include hardware circuits, and may further be controlled by switches, fuses, bond wires, metal masks, firmware, and/or software. Similarly, various items may be described as performing a task or tasks, for convenience in the description. Such descriptions should be interpreted as including the phrase "configured to." Reciting an item that is configured to perform one or more tasks is expressly intended not to invoke 35 U.S.C. 112, paragraph (f) interpretation for that unit/circuit/component. More generally, the recitation of any element is expressly intended not to invoke 35 U.S.C. §112, paragraph (f) interpretation for that element unless the language "means for" or "step for" is specifically recited.

As used herein, the term based on is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase "based on" is thus synonymous with the phrase "based at least in part on."

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Dataflow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SEVIDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

Metapipeline—a subgraph of a computation graph that includes a producer operator providing its output as an input to a consumer operator to form a pipeline. A metapipelines may be nested within another metapipeline, that is, producer operators and consumer operators may include other metapipelines.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a metapipeline at the graph execution level (typically a sequence of logical operations that are to be repetitively executed) that enables correct timing and loop control of node-level operations of the configured graph. Gate-level pipelines are usually hard wired and unchangeable, whereas metapipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data according to a programmed pattern.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, see, for example, FIGS. 6-11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes, as further referenced herein, and may also be used to run computer programs, such as the compiler 160 further described herein with reference to FIG. 12. In some implementations, the compiler may run on a computer that is similar to the computer described with reference to FIG. 2, but separate from host 180.

CGR processor 110 may accomplish computational tasks by executing a configuration file 165 (for example, a PEF file). For the purposes of this description, a configuration file corresponds to a dataflow graph, or a translation of a dataflow graph, and may further include initialization data. A compiler 160 compiles the high-level program to provide the configuration file 165. Runtime processes 170 may install the configuration file 165 in CGR processor 110. In some implementations described herein, a CGR array is configured by programming one or more configuration stores with all or parts of the configuration file 165. A single configuration store may be at the level of the CGR processor 110 or the CGR array 120, or a CGR unit may include an individual configuration store. The configuration file 165 may include configuration data for the CGR array 120 and CGR units in the CGR array 120, and link the computation graph to the CGR array 120. Execution of the configuration file by CGR processor 110 causes the CGR array 120 to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
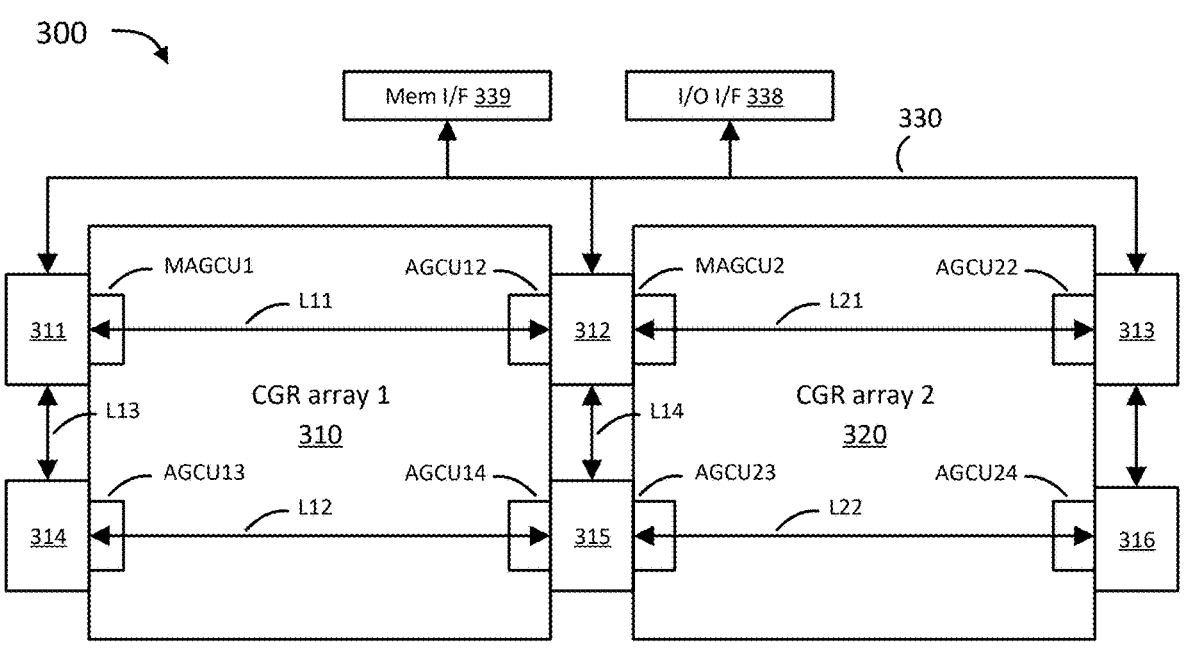
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
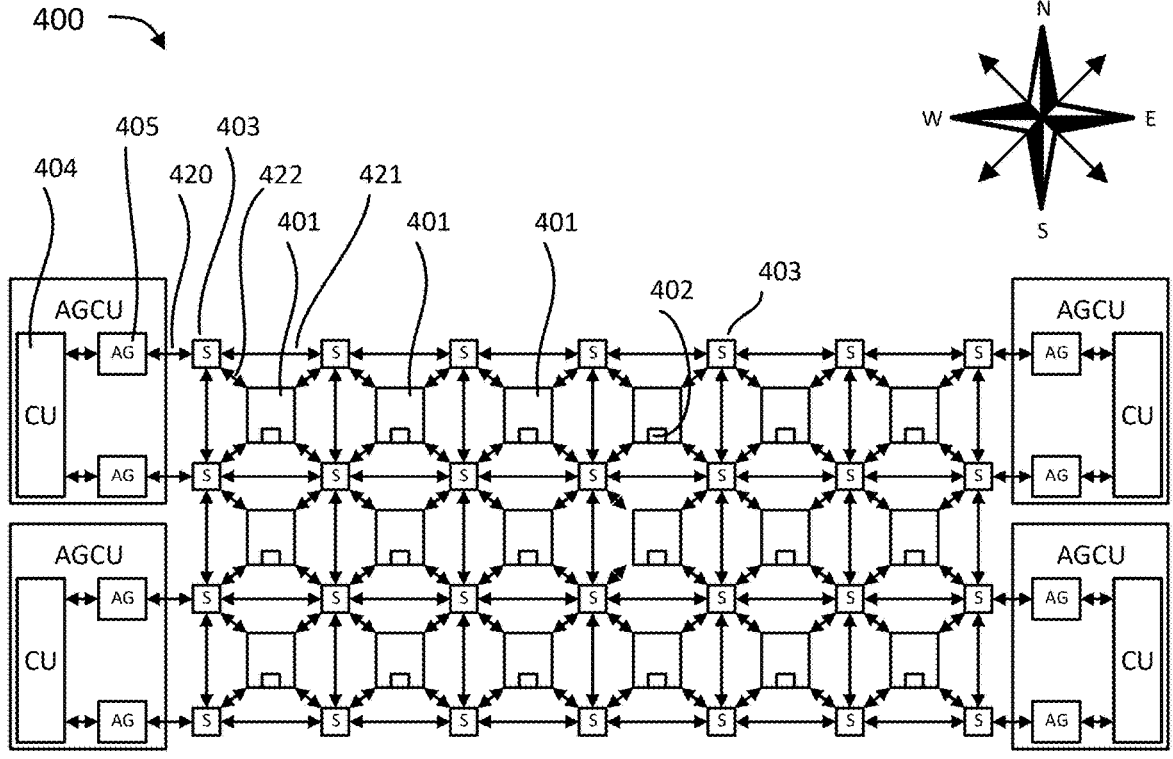
FIG. 4 illustrates an example CGR array, including an array of CGR units in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
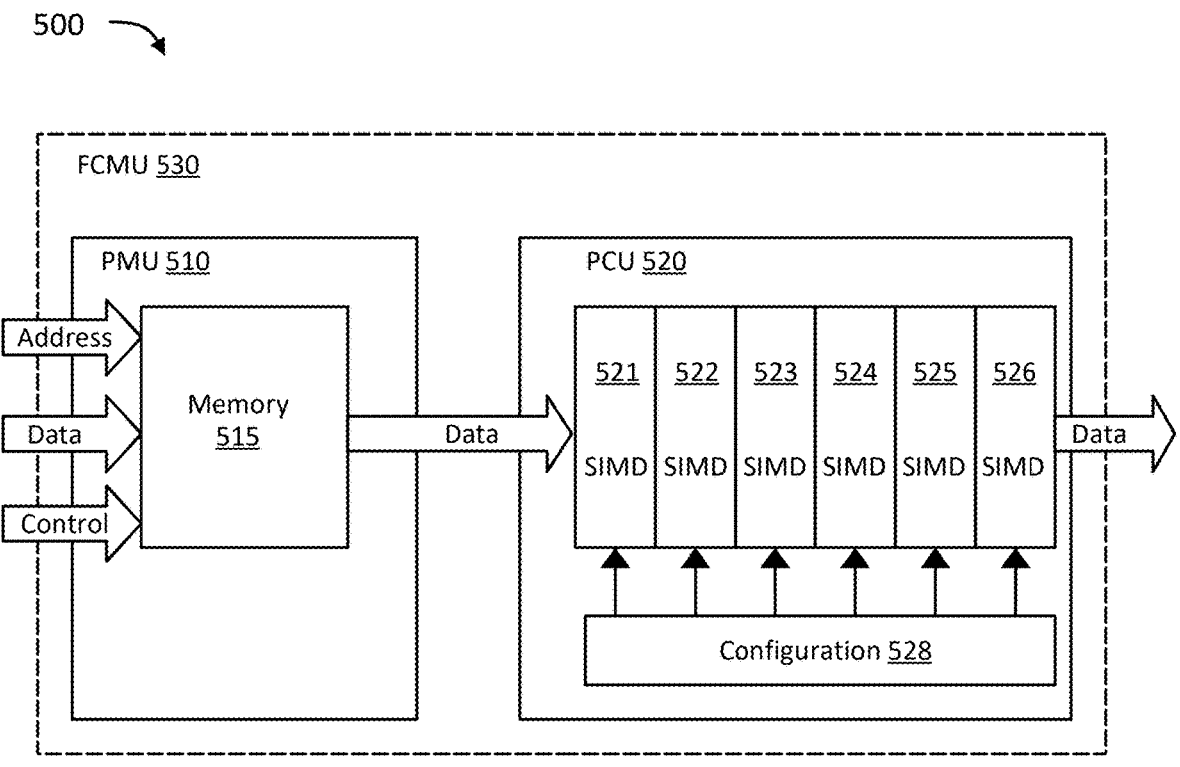
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, such as SIMID 521 through SIMID 526, and configuration store 528. The processor stages may include ALUs, or SEVIDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
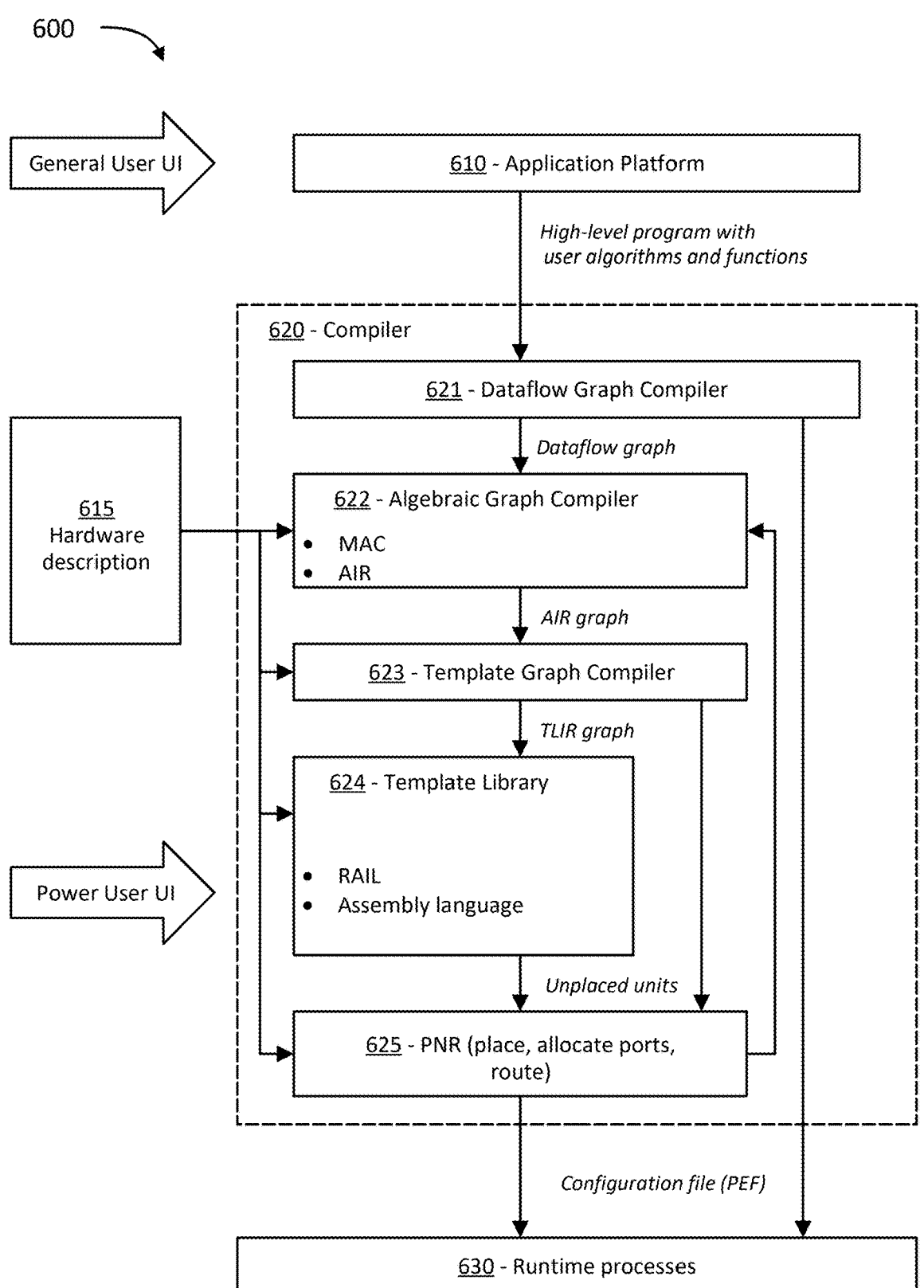
FIG. 6 is a block diagram of a compiler stack implementation suitable for generating a configuration file for a CGR processor.

FIG. 6 is a block diagram of a compiler stack 600 implementation suitable for generating a configuration file for a CGR processor. FIGS. 7-11 illustrate various representations of an example user program 700 corresponding to various stages of a compiler stack such as compiler stack 600. As depicted, compiler stack 600 includes several stages to convert a high-level program (e.g., user program 700) with statements 710, also shown as computation graph 750, that define user algorithms and functions, e.g., algebraic expressions and functions, to configuration data for the CGR units. The example user program 700 depicted in FIG. 7 comprises statements 710 that invoke various PyTorch functions.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

FIG. 7 shows an example user program 700 in an example first stage of the compiler stack. User program 700 generates a random tensor X1 with a normal distribution in the RandN node. It provides the tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function. User program 700 corresponds with computation graph 750.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autograd and gradient normalization, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) level that translates high-level graph and mapping decisions provided by the MAC level into explicit AIR/Tensor statements 800 (see FIG. 8) and one or more corresponding algebraic graphs 850. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

FIG. 8 shows the user program 700 in an example second stage of the compiler stack. At this stage, the algebraic graph compiler replaces the Softmax macro by its constituents. The Softmax function is given as $$\frac{e^{\{z_i\}}}{\sum_{j=1}^{K} e^{\{z_j\}}}.$$

This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR statements 900 (see FIG. 9) and/or graphs (graph 950 is shown), optimizing for the target hardware architecture into unplaced variable-sized units (referred to as logical CGR units) suitable for PNR 625. Template graph compiler 623 may allocate metapipelines, such as metapipeline 910 and metapipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
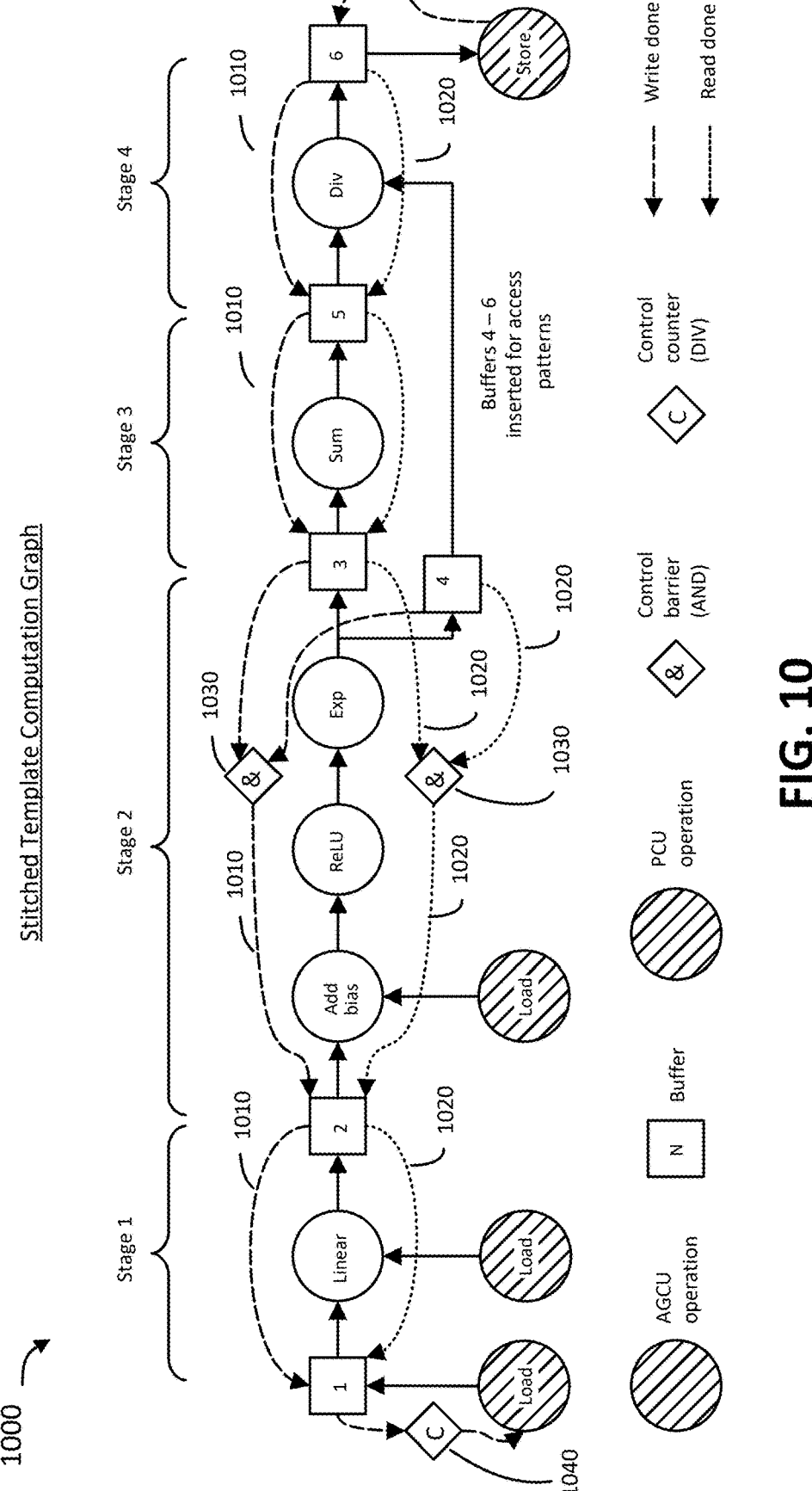
FIG. 10 shows the user program in an example fourth stage of the compiler stack.

FIG. 10 shows the user program 700 in an example fourth stage of the compiler stack. The template graph compiler

623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010-1020 and control gates 1030-1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR 625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or place-holders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

FIG. 11 shows the logical computation graph 1100 and an example physical layout 1150 of the user program.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 12:
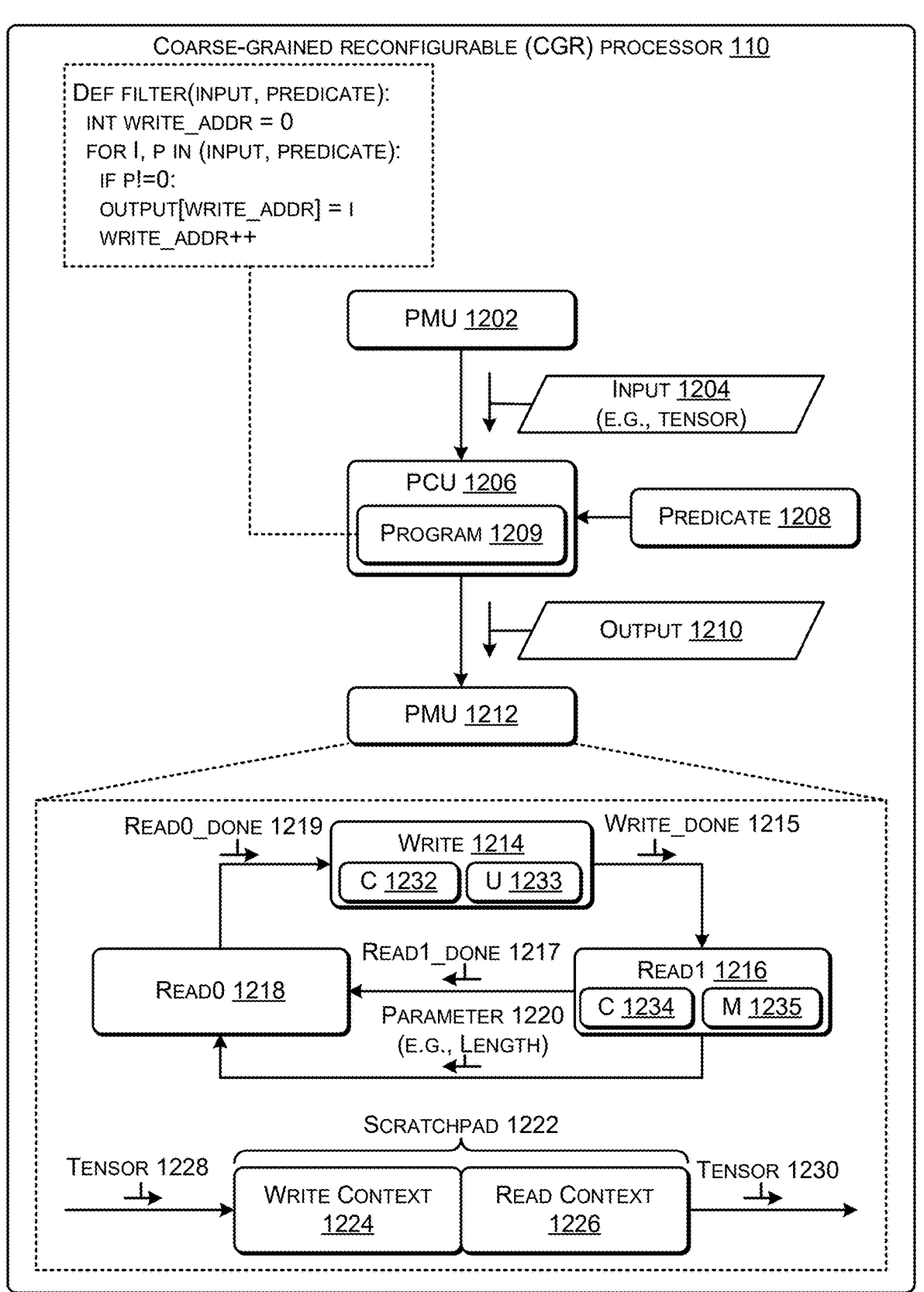
FIG. 12 shows an example of a first program that outputs a variable length tensor.

FIG. 12 shows an example of a system including a CGR processor 110 to execute a first program that outputs a variable length tensor. The system of FIG. 12 illustrates techniques used during runtime to manage a program that outputs a variable length tensor. The program in the system of FIG. 12 is called filter. Filter receives an input tensor and a predicate and generates an output tensor that includes elements satisfying the predicate. Three techniques are used to handle data-dependent dynamic tensor lengths. (1) Intra-operator handling of dynamic tensor sizes. A counter is maintained in one of the contexts (e.g., write context or read context) and the counter is incremented conditionally on a predicate. The value of the counter is communicated to consumers of the output. (2) Intra-operator control synchronization. The control flow synchronizes a tensor size counter between a producer of the size counter and consumers of the size counter to avoid the consumers using stale counter values. (3) Inter-operator communication of dynamic tensor length. Downstream operators that intend to use an operator's output tensor receive a final tensor size, which is communicated on-chip using scalars or through off-chip memory. Because a tensor size is specified for an operator and its associated downstream consumers at compile time, an upper bound for the tensor size is used. This size is replaced by a scalar value generated at runtime.

PMU 1202 provides input 1204 to PCU 1206 that is executing a program 1209. An example of pseudocode for program 1209 is shown in FIG. 12. The input 1204 includes a tensor (having either a static or a dynamic size) that is tiled and loaded in small batches into a scratchpad 1222. The scratchpad 1222 includes a write context 1224 and a read context 1226. A tensor 1228 is input to the write context 1224. The read context 1226 outputs a tensor 1230. For example, the input 1204 may be a first tensor. The PCU 1206 may receive a predicate 1208 that includes a second tensor. The predicate 1208 may be a bit vector that indicates whether to keep or drop elements in the first tensor. The filter program 1209 operates on the input 1204 (first tensor) to keep those elements indicated by the predicate 1208 (second tensor). Thus, the number of elements in output 1210 is data dependent as the length depends on the input 1204 and the predicate 1208. For example, assume input 1204=(1, 2, 3, 4, 5, 6, 7, 8) and predicate 1208=(1, 0, 1, 1, 0, 0, 1, 0), where "1" indicates to keep (the element in that position in the tensor) and "0" indicates delete (the element in that position in the tensor). In this example, the program 1209 generates output 1210=(1, 3, 4, 7). The length of the output 1210 is dependent on the input 1204 and the predicate 1208. Output 1210 is stored in PMU 1212.

FIG. 12 illustrates a simple example illustrating how the techniques may be used. In FIG. 12, the PMU 1212 performs a read1 1216 that causes a read command to be issued while read0 1218 performs the actual read from memory. When a write 1214 is completed, a write_done 1215 is sent to read1 1216 to indicate that a new read may be initiated. Read1 1216 sends a read1_done 1217 to read0 1218 to request that a read from memory be performed. Read1 1216 provides a parameter 1220 indicating a length (e.g., current tensor length). Of course, this is merely an example and the two reads may, in some cases, be implemented as a single read operation.

In terms of intra-operator dynamic tensor size, a write 1214 of PMU 1212 maintains a counter 1232 that has a maximum statically programmed to an upper bound 1233. The counter stride is set by an external scalar port that receives the filter predicate 1208. When a maximum of the counter 1232 is reached, a context change occurs to read a current value of the counter 1232 and use the current value to set a maximum 1235 of a counter 1234 of the read context. In terms of intra-operator control, FIG. 1 illustrates that Read1 1216 is blocked by Write 1214, which in-turn blocks Read0 1218. In this way, Read0 1218 uses an updated (current) counter 1234 value (e.g., output size). In terms of inter-operator dynamic tensor size, a size of the output 1210 tensor is derived at the end of execution of the program 1209 (e.g., filter) and the size is communicated to downstream operators, who use the size to program their respective write and/or read counter maximums, similar to what is described herein for the operation of the program 1209. Note that each PMU's scratchpad 1222 operates as a multi-buffered meta-pipeline that allows readers and writers to operate on independent batches of the entire tensor. The address space of the scratchpad 1222 is partitioned so that a producer pipeline's write context writes to one buffer, while a consumer pipeline's read context reads from another buffer. When both pipelines finish, these buffers swap. In this way, performance is improved by overlapping write and read operations.

Figure 13:
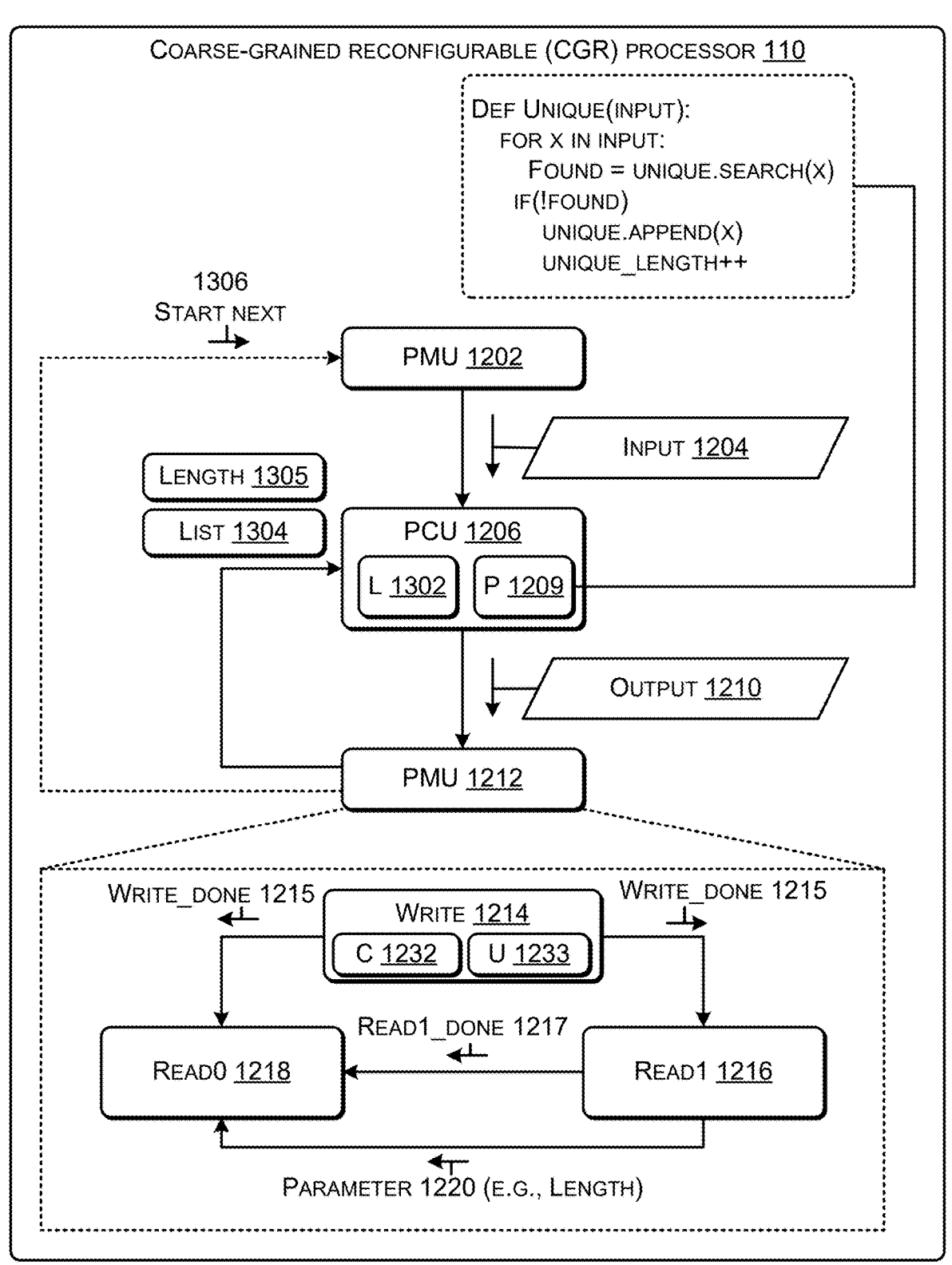
FIG. 13 shows an example of a second program that outputs a variable length tensor.

FIG. 13 shows an example of a system including a CGR processor 110 to execute a second program that outputs a variable length tensor. In FIG. 13, the program 1209 being executed by PCU 1206 is called Unique. Unique receives an input tensor and generates an output tensor with no duplicates. FIG. 11 includes pseudocode for the algorithm used by Unique. For a particular element in input 1204 (tensor), the program 1209 searches for the presence of the particular element in a current list 1302 of unique elements. If the particular element is not found in the current list 1302, the program 1209 appends the particular element from the input 1204 (tensor) to the list 1302 which is the sent as output 1210 to the PMU 1212. Appending the particular element from the input 1204 (tensor) to the list 1302 thus increments the tensor size. The output 1210 therefore has a dynamic length as the length is based on the number of unique elements in the input 1204. For example, assume input 1204=(1, 1, 3, 5, 5, 5, 7, 8, 8, 8, 8, 8). In this example, the output 1210=(1, 3, 5, 7, 8) identifies the unique elements in the input tensor.

The PMU 1212 communicates a list 1304 that identifies a current list of unique elements and a length 1305 that identifies a length of the list 1304. After Unique has completed parsing the input 1204 tensor, the PMU 1212 may send an instruction 1036 to start processing a next input tensor.

Read1 1216 (MMU) provides parameter 1220 to Read0 1218 which, for Unique, indicates a length of the tensor to retrieve. Note that, as illustrated, Unique is a brute force algorithm and not particularly efficient. The purpose of Unique is to illustrate handling dynamic tensor lengths and it should be understood that a more efficient algorithm may be implemented.

In terms of intra-operator dynamic tensor size, Unique (similar to Filter in FIG. 12), maintains the counter 1232 in the PMU's write 1214 context and the counter 1232 is programmed statically to the upper bound 1233 of the input 1204 tensor. The counter stride is set using an external scalar provided by the search portion of Unique that is executed by PCU 1206. In terms of intra-operator control, FIG. 13 illustrates that Read1 1216 is blocked by Write 1214, which in-turn blocks Read0 1218. Read1 1216 receives a current value of counter 1232, which read 1216 communicates to its consumers (e.g., Read0 1218 and search PCU). In terms of inter-operator dynamic tensor length, a size of a tensor in output 1210 is derived when the Unique program has completed and is communicated to on-chip downstream operators, who use the output tensor size to program a maximum for downstream read operations, write operations, counters, and other types of operations. For downstream operators consuming the output 1210 later in the execution flow, the size of tensor in the output 1210 may be check-pointed in off-chip DRAM as well.

Operators (such as Filter and Unique) that produce dynamic-sized tensors are parallelizable across multiple PCU/PMU streams to trade-off resource usage with operator throughput. Each physical stream tracks the size of its corresponding tensor. These software control techniques also extend to higher dimensional tensors and enable dynamically tracking each data-dependent loop-bound within the loop nest.

FIG. 14 illustrates a flowchart of a process 1400 that includes updating a counter to create an updated counter. The process 1400 may be performed by the CGR 110.

At 1402, the process may determine that a program produces an output that includes a variable length tensor. At 1404, the process may determine a maximum size of the variable length tensor. At 1406, the process may set, based on the maximum size, a maximum of a counter associated with the program. The counter may identify the size of the variable length tensor and the counter is set to an initial value of 0. For example, in FIGS. 12 and 13, when compiling the program 1209, a compiler may determine that the program 1209 produces the output 1210 that includes a variable length tensor, determine a maximum size of the output 1210, and may set the upper limit 1233 and/or the maximum 1235 based on the maximum size of the output 1210. The process maintains a counter for individual variable length tensor(s), where the counter has 3 aspects: (1) a counter maximum: the counter "rolls over" e.g., the counter resets after it hits a pre-determined value (referred to as the counter maximum), (2) a counter stride refers to a cadence of incrementing the counter (e.g., step size), and (3) a current value refers to an actual value of the counter. For example, a counter having a maximum of 10 and a stride of 2 means a counter may, as it is incremented, have the values of 0, 2, 4, 6, 8, 10 and then reset to 0. For variable length tensors, the final length is unknown because the length is data dependent. Therefore, the process (1) sets a counter maximum to a maximum possible length of the tensor (e.g., a value that, in some cases, may never be attained), (2) the initial value of the counter defaults to 0 implicitly when the program starts (e.g., initiates execution), (3) the counter stride is used to conditionally increment a value of the counter value, thereby incorporating the dynamic aspect of the tensor into the length, (4) the value of the counter is communicated downstream, both internally and externally, with intermediate values communicated internally within an operator, and the final length communicated externally to downstream consumers, and (5) the final length of the output is determined after the input tensor has been completely processed. Note this would mean we don't really hit the counter maximum set at the start of the program.

At 1408, the process may (after compiling the program) initiate execution of the program. The execution of the program causes the program to receive an input tensor. For example, in FIGS. 12 and 13, the PCU 1206 may initiate execution of the program 1209, causing the program 1209 to receive the input 1204 and, in some cases, receive the predicate 1208.

At 1410, the process may determine that the program is operating on a first portion of the input tensor. At 1412, the process may update the counter to create an updated counter (e.g., while the program is operating on the first portion of the input tensor). At 1414, the process may communicate the updated counter to one or more consumers within the program (e.g., internally). For example, in FIG. 12, the write 1214 and/or the read1 1216 may communicate the parameter 1220, identifying a current length of the input 1204 after being modified by the program 1209. For example, assume input 1204=(1, 2, 3, 4, 5, 6, 7, 8) and predicate 1208=(1, 0, 1, 1, 0, 0, 1, 0), where "1" indicates to keep (the element in that position in the tensor) and "0" indicates delete (the element in that position in the tensor). In this example, the program 1209 generates output 1210=(1, 3, 4, 7). The length of the output 1210 is dependent on the input 1204 and the predicate 1208. After processing "1" in the input 1204, the parameter 1220 (length) is 1, after processing "2" in the input 1204, the parameter 1220 (length) is 1, after processing "3" in the input 1204, the parameter 1220 (length) is 2, after processing "4" in the input 1204, the parameter 1220 (length) is 3, after processing "5" in the input 1204, the parameter 1220 (length) is 3, after processing "6" in the input 1204, the parameter 1220 (length) is 3, after processing "7" in the input 1204, the parameter 1220 (length) is 4, and after processing "8" in the input 1204, the parameter 1220 (length) is 4. As each component in the input 1204 is processed by the program 1209, a value of the current counter is communicated downstream within the program. For example, read1 1216 communicates the parameter 1220 that identifies the current length of the output 1210 as the program 1209 reads individual elements of the input 1204 and determines, based on the predicate 1208, whether to place the individual elements in the output 1210.

At 1416, the process determines that the program has completed operating on the input tensor. At 1418, the process determines a final size of the output of the program that includes the variable length tensor. At 1420, the process communicates the final size to one or more downstream consumers (e.g., external to the program) of the output of the program. For example, in FIGS. 12 and 13, after determining that the program 1209 has completed operating on the input 1204, the PMU 1212 may determine a size of the output tensor in the output 1210 and communicates the size to downstream consumers of the output 1210.

Particular Implementations

Described implementations of the subject matter can include one or more features, alone or in combination.

Clause 1. A computer-implemented method to execute a program on a coarse-grained reconfigurable (CGR) processor comprising an array of CGR units, the computer-implemented method comprising: determining that the program produces an output that includes a variable length tensor; determining a maximum size of the variable length tensor; setting, based on the maximum size, a maximum of a counter associated with the program, the counter set to an initial value of zero; initiating execution of the program, wherein execution of the program causes the program to receive an input tensor; determining that the program is operating on a first portion of the input tensor; performing an update to the counter, while the program is executing and based on the program operating on the first portion of the input tensor, to create an updated counter; and communicating the updated counter to one or more consumers of the counter within the program.

Clause 2. The computer-implemented method of clause 1, wherein: determining that the program produces the output that includes a variable length tensor is performed at a compile time.

Clause 3. The computer-implemented method of clause 1, wherein: determining the maximum size of the variable length tensor is performed at a compile time.

Clause 4. The computer-implemented method of clause 1, further comprising: determining that the program is operating on a second portion of the input tensor; performing a second update to the counter, while the program is executing and based on the program operating on the second portion of the input tensor, to create a second updated counter; and communicating the second updated counter to the one or more consumers within the program.

Clause 5. The computer-implemented method of clause 1, further comprising: determining that the program has completed operating on the input tensor; determining a final size of the output of the program that includes the variable length tensor; and communicating the final size to one or more downstream consumers of the output of the program.

Clause 6. The computer-implemented method of clause 1, wherein the counter is located in: a read context of a memory unit that is used when reading the first portion of the input tensor; a write context of the memory unit that is used when writing a portion of the output; or any combination thereof.

Clause 7. The computer-implemented method of clause 6, wherein: the write context performs a write operation to a first buffer in a scratchpad of the memory unit; the read context performs a read operation from a second buffer in the scratchpad of the memory unit; and the read operation and the write operation overlap in time.

Clause 8. A non-transitory computer-readable storage medium storing computer program instructions that, when executed on a processor, perform operations comprising: determining that a program produces an output that includes a variable length tensor; determining a maximum size of the variable length tensor; setting, based on the maximum size, a maximum of a counter associated with the program, the counter set to an initial value of zero; initiating execution of the program, wherein execution of the program causes the program to receive an input tensor; determining that the program is operating on a first portion of the input tensor; performing an update to the counter, while the program is executing and based on the program operating on the first portion of the input tensor, to create an updated counter; and communicating the updated counter to one or more consumers of the counter within the program.

Clause 9. The non-transitory computer-readable storage medium of clause 8, wherein: determining that the program produces the output that includes a variable length tensor is performed at compile time.

Clause 10. The non-transitory computer-readable storage medium of clause 8, further comprising: determining the maximum size of the variable length tensor is performed at compile time.

Clause 11. The non-transitory computer-readable storage medium of clause 8, further comprising: determining that the program is operating on a second portion of the input tensor; performing a second update to the counter, while the program is executing and based on the program operating on the second portion of the input tensor, to create a second updated counter; and communicating the second updated counter to the one or more consumers of the counter within the program.

Clause 12. The non-transitory computer-readable storage medium of clause 8, further comprising: determining that the program has completed operating on the input tensor; determining a final size of the output of the program that includes the variable length tensor; and communicating the final size to one or more downstream consumers of the output of the program.

Clause 13. The non-transitory computer-readable storage medium of clause 8, wherein the counter is located in: a read context of a memory unit that is used when reading the first portion of the input tensor; a write context of the memory unit that is used when writing a portion of the output; or any combination thereof.

Clause 14. The non-transitory computer-readable storage medium of clause 13, wherein: the write context performs a write operation to a first buffer in a scratchpad of the memory unit; the read context performs a read operation from a second buffer in the scratchpad of the memory unit; and the read operation and the write operation overlap in time.

Clause 15. A system comprising one or more processors coupled to a memory device, the memory device to store computer program instructions that are executable by the one or more processors to perform operations comprising: determining that a program produces an output that includes a variable length tensor; determining a maximum size of the variable length tensor; setting, based on the maximum size, a maximum of a counter associated with the program, the counter set to an initial value of zero; initiating execution of the program, wherein execution of the program causes the program to receive an input tensor; determining that the program is operating on a first portion of the input tensor; performing an update to the counter, while the program is executing and based on the program operating on the first portion of the input tensor, to create an updated counter; and communicating the updated counter to one or more consumers of the counter within the program.

Clause 16. The system of clause 15, wherein: determining that the program produces the output that includes a variable length tensor is performed at a compile time.

Clause 17. The system of clause 15, wherein: determining the maximum size of the variable length tensor is performed at a compile time.

Clause 18. The system of clause 15, further comprising: determining that the program is operating on a second portion of the input tensor; performing a second update to the counter, while the program is executing and based on the program operating on the second portion of the input tensor, to create a second updated counter; and communicating the second updated counter to the one or more consumers of the counter within the program.

Clause 19. The system of clause 15, further comprising: determining that the program has completed operating on the input tensor; determining a final size of the output of the program that includes the variable length tensor; and communicating the final size to the one or more downstream consumers of the output of the program.

Clause 20. The system of clause 15, wherein: the counter is located in: a read context of a memory unit that is used when reading the first portion of the input tensor; a write context of the memory unit that is used when writing a portion of the output; or any combination thereof; the write context performs a write operation to a first buffer in a scratchpad of the memory unit; the read context performs a read operation from a second buffer in the scratchpad of the memory unit; and the read operation and the write operation overlap in time.

FURTHER OR ADDITIONAL CONSIDERATIONS

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a CGRA system, a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dies in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit of the technology disclosed.

What is claimed is:

1. A computer-implemented method to execute a program on a coarse-grained reconfigurable (CGR) processor comprising an array of CGR units, the computer-implemented method comprising:

determining that the program produces an output that includes a variable length tensor;

determining a maximum size of the variable length tensor;

setting, based on the maximum size, a maximum value of a counter associated with the program;

setting a counter value of the counter to an initial value of zero;

initiating execution of the program, wherein execution of the program causes the program to receive an input tensor;

determining that the program is operating on a first portion of the input tensor;

performing an update to the counter value of the counter, while the program is executing and based on the program operating on the first portion of the input tensor, to create an updated counter value; and communicating the updated counter value to one or more consumers of the counter within the program.

2. The computer-implemented method of claim 1, wherein:

determining that the program produces the output that includes a variable length tensor is performed at a compile time.

3. The computer-implemented method of claim 1, wherein:

determining the maximum size of the variable length tensor is performed at a compile time.

4. The computer-implemented method of claim 1, further comprising:

determining that the program is operating on a second portion of the input tensor;

performing a second update to the counter value of the counter, while the program is executing and based on the program operating on the second portion of the input tensor, to create a second updated counter value; and communicating the second updated counter value to the one or more consumers of the counter within the program.

5. The computer-implemented method of claim 1, further comprising:

determining that the program has completed operating on the input tensor;

determining a final size of the output; and communicating the final size to one or more downstream consumers of the output.

6. The computer-implemented method of claim 1, wherein the counter is located in:

a read context of a memory unit that is used when reading the first portion of the input tensor; or a write context of the memory unit that is used when writing a portion of the output.

7. The computer-implemented method of claim 6, wherein:

the write context performs a write operation to a first buffer in a scratchpad of the memory unit;

the read context performs a read operation from a second buffer in the scratchpad of the memory unit; and the read operation and the write operation overlap in time.

8. A non-transitory computer-readable storage medium storing computer program instructions that, when executed on a processor, perform operations comprising:

determining that a program produces an output that includes a variable length tensor;

determining a maximum size of the variable length tensor;

setting, based on the maximum size, a maximum value of a counter associated with the program;

setting a counter value of the counter to an initial value of zero;

initiating execution of the program, wherein execution of the program causes the program to receive an input tensor;

determining that the program is operating on a first portion of the input tensor;

performing an update to the counter value of the counter, while the program is executing and based on the program operating on the first portion of the input tensor, to create an updated counter value; and communicating the updated counter value to one or more consumers of the counter within the program.

9. The non-transitory computer-readable storage medium of claim 8, wherein:

determining that the program produces the output that includes a variable length tensor is performed at compile time.

10. The non-transitory computer-readable storage medium of claim 8, wherein:

determining the maximum size of the variable length tensor is performed at compile time.

11. The non-transitory computer-readable storage medium of claim 8, the operations further comprising:

determining that the program is operating on a second portion of the input tensor;

performing a second update to the counter value of the counter, while the program is executing and based on the program operating on the second portion of the input tensor, to create a second updated counter value; and communicating the second updated counter value to the one or more consumers of the counter within the program.

12. The non-transitory computer-readable storage medium of claim 8, the operations further comprising:

determining that the program has completed operating on the input tensor;

determining a final size of the outputs; and communicating the final size to one or more downstream consumers of the output of the program.

13. The non-transitory computer-readable storage medium of claim 8, wherein the counter is located in:

a read context of a memory unit that is used when reading the first portion of the input tensor; or a write context of the memory unit that is used when writing a portion of the output.

14. The non-transitory computer-readable storage medium of claim 13, wherein:

the write context performs a write operation to a first buffer in a scratchpad of the memory unit;

the read context performs a read operation from a second buffer in the scratchpad of the memory unit; and the read operation and the write operation overlap in time.

15. A system comprising one or more processors coupled to a memory device, the memory device to store computer program instructions that are executable by the one or more processors to perform operations comprising:

determining that a program produces an output that includes a variable length tensor;

determining a maximum size of the variable length tensor;

setting, based on the maximum size, a maximum value of a counter associated with the program;

setting a counter value of the counter to an initial value of zero;

initiating execution of the program, wherein execution of the program causes the program to receive an input tensor;

determining that the program is operating on a first portion of the input tensor;

performing an update to the counter value of the counter, while the program is executing and based on the program operating on the first portion of the input tensor, to create an updated counter value; and communicating the updated counter value to one or more consumers of the counter within the program.

16. The system of claim 15, wherein:

determining that the program produces the output that includes a variable length tensor is performed at a compile time.

17. The system of claim 15, wherein:

determining the maximum size of the variable length tensor is performed at a compile time.

18. The system of claim 15, the operations further comprising:

determining that the program is operating on a second portion of the input tensor;

performing a second update to the counter value of the counter, while the program is executing and based on the program operating on the second portion of the input tensor, to create a second updated counter value; and communicating the second updated counter value to the one or more consumers of the counter within the program.

19. The system of claim 15, the operations further comprising:

determining that the program has completed operating on the input tensor;

determining a final size of the output; and communicating the final size to one or more downstream consumers of the output of the program.

20. The system of claim 15, wherein:

the counter is located in at least one of:

a read context of a memory unit that is used when reading the first portion of the input tensor; or a write context of the memory unit that is used when writing a portion of the output;

the write context performs a write operation to a first buffer in a scratchpad of the memory unit;

the read context performs a read operation from a second buffer in the scratchpad of the memory unit; and the read operation and the write operation overlap in time.

*   *   *   *   *